United States Patent
Zhou et al.

(10) Patent No.: US 12,219,206 B2
(45) Date of Patent: Feb. 4, 2025

(54) ANALYSIS METHOD AND NON-TRANSITORY COMPUTER-READABLE STORAGE MEDIUM

(71) Applicant: REALTEK SEMICONDUCTOR CORPORATION, Hsinchu (TW)

(72) Inventors: Hao Zhou, Suzhou (CN); Hong Chang, Suzhou (CN); Xin Sheng Yang, Suzhou (CN); Tao Xu, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 237 days.

(21) Appl. No.: 18/062,202

(22) Filed: Dec. 6, 2022

(65) Prior Publication Data
US 2023/0283838 A1 Sep. 7, 2023

(30) Foreign Application Priority Data
Mar. 4, 2022 (CN) .......................... 202210207884.2

(51) Int. Cl.
*H04N 21/4367* (2011.01)
*H04N 21/4363* (2011.01)

(52) U.S. Cl.
CPC ... *H04N 21/4367* (2013.01); *H04N 21/43632* (2013.01)

(58) Field of Classification Search
CPC .................... H04N 21/4367; H04N 21/43632
See application file for complete search history.

(56) References Cited

U.S. PATENT DOCUMENTS

| | | | |
|---|---|---|---|
| 10,607,564 B2 * | 3/2020 | Xie | G06F 13/4072 |
| 2016/0125838 A1 * | 5/2016 | Hundal | G09G 5/006 |
| | | | 345/520 |
| 2023/0130414 A1 * | 4/2023 | Ishii | G09G 3/2022 |
| | | | 345/214 |

FOREIGN PATENT DOCUMENTS

CN 113688080 B 11/2021

\* cited by examiner

*Primary Examiner* — Jonathan A Bui
(74) *Attorney, Agent, or Firm* — WPAT, P.C.; Anthony King

(57) ABSTRACT

An analysis method configured to analyze original signals on an auxiliary channel of DisplayPort between a transmitter and at least one receiver, includes: receiving a first original signal of the original signals; dividing the first original signal to obtain a DPCD address and a first data; storing the first data according to the DPCD address; determining whether the first data is a redundant signal; when the first data is not the redundant signal, analyzing the first data; and displaying a topology of the at least one receiver. The operation of analyzing the first data includes generating the topology of the at least one receiver.

20 Claims, 3 Drawing Sheets

ANALYSIS METHOD AND NON-TRANSITORY COMPUTER-READABLE STORAGE MEDIUM

CROSS-REFERENCE TO RELATED APPLICATIONS

This application claims the benefit of priority to Patent Application No. 202210207884.2, filed in China on Mar. 4, 2022, which is incorporated by reference in its entirety.

TECHNICAL FIELD

The present application relates to a detection method and a non-transitory computer readable medium, particularly to a detection method and a non-transitory computer readable medium for use in DisplayPort (DP).

BACKGROUND

More and more displays use the DP standard protocol. When testing these displays, the DP auxiliary channel can be used to determine if the display is operating properly. However, the signals on the auxiliary channel are constantly updated in real time, and such a large amount of information makes it costly in terms of labor time to test the displays. Therefore, it has become an important issue in the related field to efficiently determine the operation of the display through the auxiliary channel.

SUMMARY OF THE INVENTION

One aspect of the present application provides an analysis method configured to analyze original signals on an auxiliary channel of a DisplayPort between a transmitter and at least one receiver. The analysis method includes the operations of: receiving a first original signal of the original signals; dividing the first original signal to obtain a first data of the first original signal and a DisplayPort configuration data (DPCD) address of the first original signal; storing the first data according to the DPCD address of the first original signal; determining whether the first data is a redundant signal; when the first data is not the redundant signal, analyzing the first data; and displaying a topology. The step of analyzing the first data includes generating the topology of the at least one receiver.

Another aspect of the present application provides a non-transient computer-readable medium configured to store a program code. When the program code is executed by a processor, the process is enabled to perform the following steps of: receiving a first original signal of the original signals, wherein the original signals are transmitted via an auxiliary channel of a DisplayPort between a transmitter and at least one receiver; dividing the first original signal to obtain a first data of the first original signal and a DPCD address of the first original signal; determining whether the first data is a redundant signal; when the first data is not the redundant signal, analyzing the first data; and displaying a topology. The step of analyzing the first data includes generating the topology of the at least one receiver.

The analysis method and the non-transitory computer readable medium of the present disclosure not only divide the auxiliary signals, but also further analyze and display the results of the divided data, which significantly reduces the labor cost and improves the accuracy of the analysis.

BRIEF DESCRIPTION OF THE DRAWINGS

Various aspects of the present application can best be understood upon reading the detailed description below and accompanying drawings. It should be noted that the various features in the drawings are not drawn to scale in accordance with standard practice in the art. In fact, the size of some features may be deliberately enlarged or reduced for the purpose of discussion.

DETAILED DESCRIPTION

Figure 1:
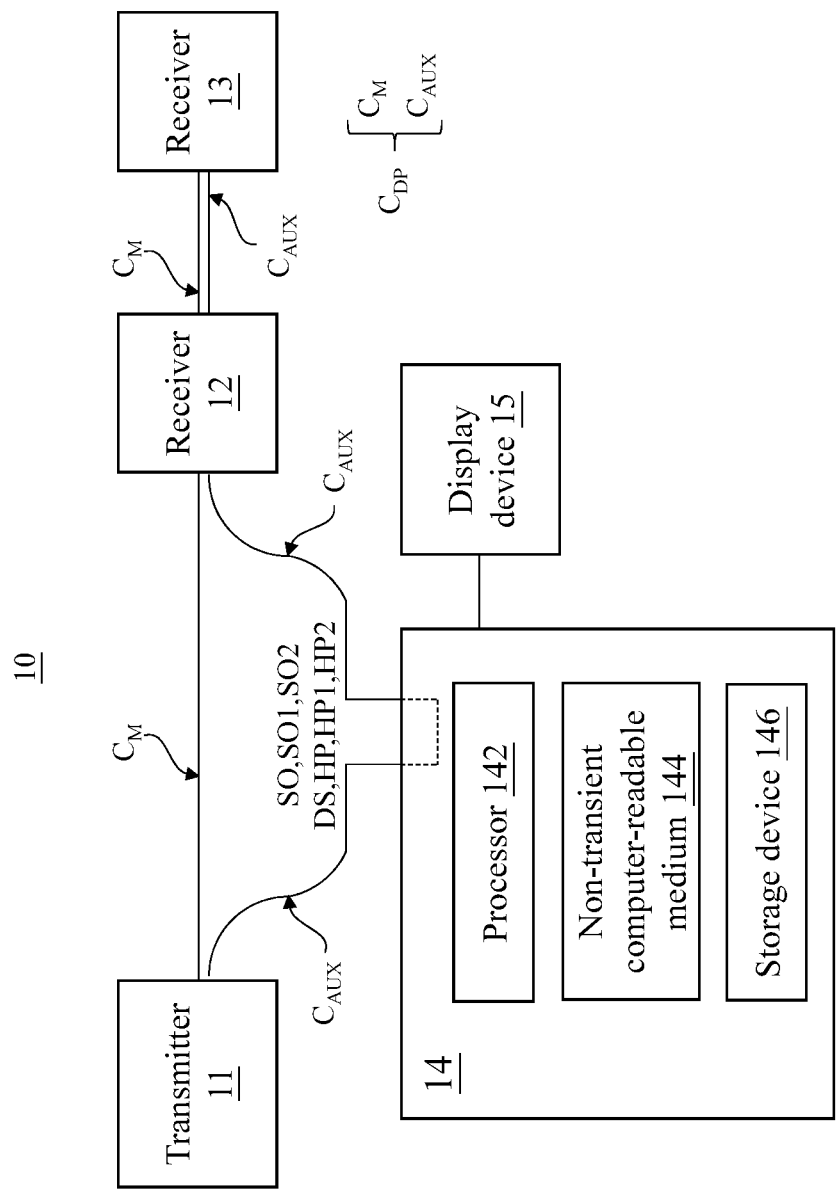
FIG. 1 is a schematic diagram of a display system according to some embodiments of the present disclosure.

FIG. 1 is a schematic diagram of a display system 10 according to some embodiments of the present disclosure. The display system 10 includes a transmitter 11, a receiver 12, a receiver 13, an analysis device 14 and a display device 15. The transmitter 11 and the receiver 12 communicate with each other via a DP channel $C_{DP}$, the receiver 12 can further serially connected to the receiver 13 via the DP channel $C_{DP}$. Generally, the receiver 12 and the receiver 13 can be any device for watching videos, such as a television, computer monitor, or projector; however, the present application is not limited thereto.

The DP channel $C_{DP}$ includes a main channel $C_M$ for transmitting video signals and an auxiliary channel $C_{AUX}$ for transmitting an auxiliary signal, wherein the analysis device 14 is configured to couple to the auxiliary channel $C_{AUX}$ to receive the auxiliary signal so as to analyze whether the operation of the display system 10 is normal. It is noted that coupling the analysis device 14 to the auxiliary channel $C_{AUX}$ is only configured to receive the auxiliary signal and will not alter or affect the operations of the transmitter 11, the receiver 12 and the receiver 13. For the ease of understanding, a bypass path of the auxiliary channel $C_{AUX}$ is shown in the analysis device 14 with a broken line. The analysis device 14 is further coupled to the display device 15, so as to display the analysis result via the display device 15.

In some embodiments, the auxiliary signal in the DP specification includes a defer signal DS, a hot plugging signal HP, an extended display identification data (EDID) and an EDID prefer timing. The analysis device 14 detect the abnormal status of the display system 10 by analyzing the auxiliary signal.

In some embodiments, the analysis device 14 includes a processor 142, a non-transient computer-readable medium 144 and a storage device 146. The non-transient computer-readable medium 144 is configured to store a program code, and the processor 142 is configured to execute the program code to perform an analysis method 20, wherein the analysis method 20 is configured to analyze a plurality of original signals SO on the auxiliary channel $C_{AUX}$ of the DP between the transmitter 11 and the receivers 12, 13. The auxiliary signal on the auxiliary channel $C_{AUX}$ is analyzed and becomes other analyzed signal. For the ease of understanding, the auxiliary signal that has not been analyzed (i.e., the signal as received from the auxiliary channel $C_{AUX}$) is referred to as the original signal SO.

In some prior technologies, when the function of display system 10 is abnormal, the system will first load a plurality of original signals into the analysis software (such as Aux Sniffer and the like) and use the analysis software to list the signal types, data contents and timestamps of the original signals. Then, the signal type, data content, and timestamp are examined manually to identify the original signal causes the problem. In the prior art, the analysis software only divides the content of the original signal into human-recognizable data, however, the analysis software does not further process the divided data. As a result, review the data manually is very costly and error-prone.

Compared with the prior art, the analysis method 20 of the present disclosure is configured to further analyze the divided data, which not only reduces the cost of processing, but also increases the accuracy of detection, and improves the performance of the analysis device 14 and/or the analysis method 20.

Figure 2:
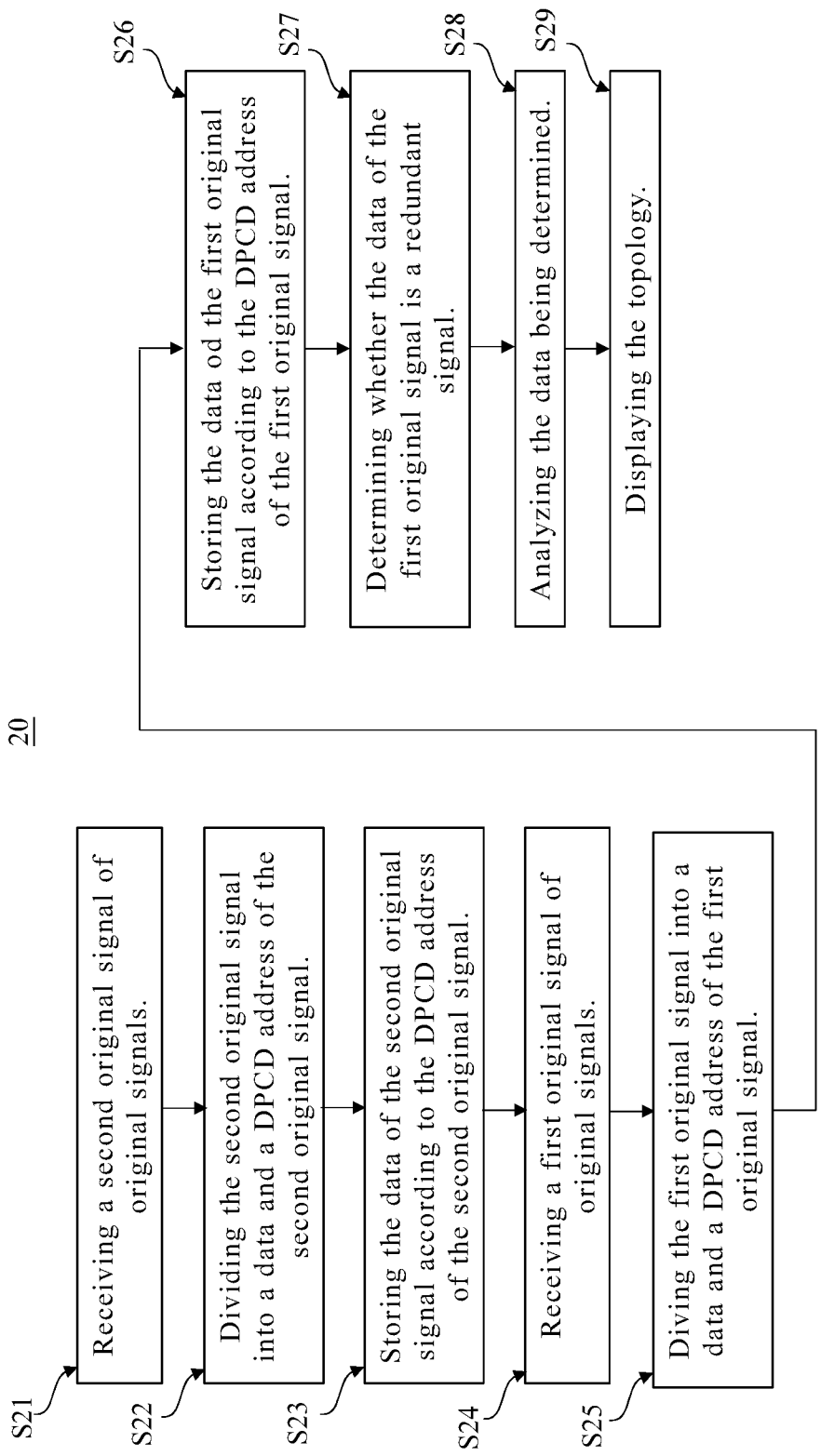
FIG. 2 is a flowchart of an analysis method according to some embodiments of the present disclosure.
Figure 3:
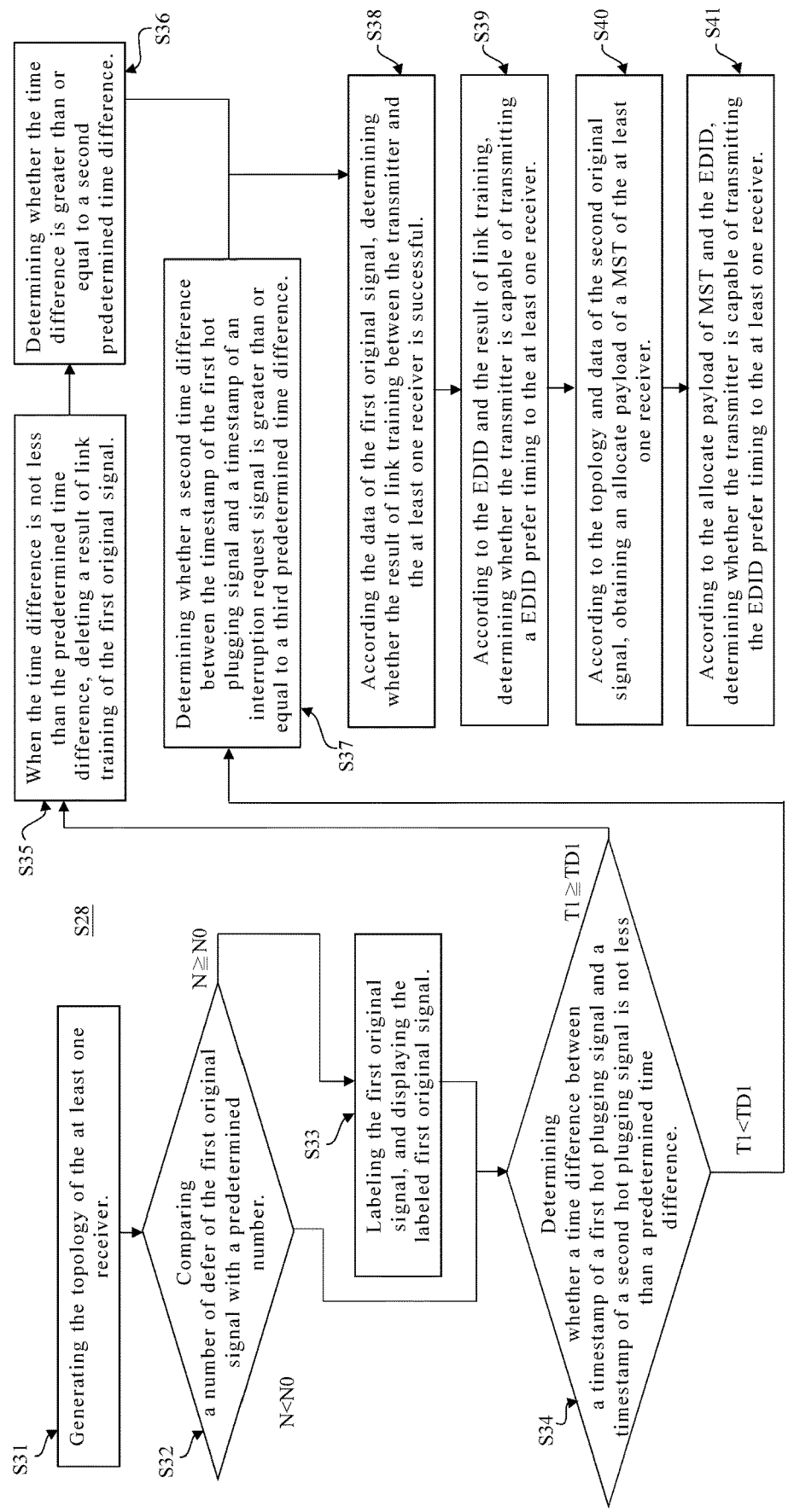
FIG. 3 is a flowchart of an analysis method according to some embodiments of the present disclosure.

A flowchart of the analysis method 20 is illustrated in FIG. 2 and FIG. 3, which include steps S21, S22, S23, S24, S25, S26, S27, S28 and S29. In the step S21, the analysis device 14 receives an original signal SO1 (corresponding to the second original signal of FIG. 2). In some embodiments, the original signal SO includes DisplayPort configuration data (DPCD) address and data. In the step S22, the analysis device 14 divides the original signal SO1 into a data and a DPCD address; then, in the step S23, the data of the original signal SO1 are stored in the storage device 146 according to the DPCD address.

In the step S24, after receiving the original signal 501, the analysis device 14 receives another original signal SO2 (corresponding to the first original signal of FIG. 2). In the step S25, the analysis device 14 divides the original signal SO2 into a data and a DPCD address; then, in the step S26, the data of the original signal SO2 are stored in the storage device 146 according to the DPCD address. Because the original signals SO are signals continuously generated in real time during the operation of the display system 10, the analysis device 14 will continuously receive these real-time signals. In this way, when original signals SO are generated continuously, the steps S21-S23 or the steps S24-S26 are performed continuously.

In some other embodiments, a plurality of original signals SO are pre-stored in another storage device, and the analysis device 14 can load the plurality of pre-stored original signals SO in an off-line mode, and then analyze the plurality of original signals SO. For the sake of brevity, the analysis method 20 is discussed using the aspect that the original signals SO are received in real time (in the on-line mode).

In some embodiments, the same original signal SO may be transmitted for multiple times because of some non-ideal condition of the system. Because the signals are the same, receiving and storing these repetitive signals not only occupies the memory capacity but also increase the amount of data to be analyzed. To address this issue, the analysis method 20 determines whether the data of the original signal SO2 is a redundant signal in the step S27.

In the step S27, the analysis device 14 is configured to determining whether the original signal SO2 corresponds to a redundant signal; i.e., determining whether the data of the original signal SO2 is a redundant signal. The analysis device 14 compares the data of the original signal SO2 with the data of the original signal SO1. When the data of the original signal SO2 differs from the data of the original signal SO1, it means that the original signal SO2 and the original signal SO1 are not the same signal and the original signal SO2 does not correspond to a redundant signal. In contrast, when the data of the original signal SO2 is the same as the data of the original signal SO1, it means that the data of the original signal SO2 is a redundant signal, and hence the analysis device 14 can delete the data of the original signal SO2 stored in the storage device 146.

In the step S28, the analysis device 14 is configured to analyze the data as determined in the step S27. In some embodiments, the step S28 has multiple analyzing steps, including, but not limited to analyzing a number of defer, detecting the status of hot plugging, detecting the result of link training, detecting the result of high-bandwidth digital content protection (HDCP) handshaking, detecting the extended display identification data (EDID), establishing the topology and analyzing whether it is capable to send an EDID prefer timing. The step S28 includes steps S31, S32, S33, S34, S35, S36, S37, S38, S39, S40 and S41 shown in FIG. 3.

In the step S31, the analysis device 14 is configured to generate the topology of the receiver 12 and the receiver 13. Specifically, the analysis device 14 is configured to present the connection relationship of the receiver 12 and the receiver 13 using the topology. In some embodiments, the display system 10 includes more receivers. Those receivers in the display system 10 may be coupled to each other in parallel or in series. In some embodiments, the analysis device 14 is able to obtain information of the assigned recourses of each receiver by the topology.

In the step S32, the analysis device 14 is configured to compare the number N of defer of the original signal SO2 with a predetermined number NO. When the receiver 12 or the receiver 13 determines that it is not able to process the instruction from the transmitter 11 in time, the receiver 12 or the receiver 13 generates a defer signal to the transmitter 11, which is configured to notify the transmitter 11 that the receiver 12 or the receiver 13 is not able to process in time. The DP specification stipulates that no more than 7 defer signals can be generated for the same instruction. When the number N of defer is less than the predetermined number NO (i.e., 7 times), the analysis method 20 proceeds to the step S34. When the number N of defer is greater than or equal to the predetermined number NO, the analysis method 20 proceeds to the step S33. To increase readability, the reference characters N and NO are used in this disclosure for discussion purposes, and these reference characters are not shown in the drawings.

In the step S33, the analysis device 14 is configured to label the original signal SO2 as an abnormal signal, and the display device 15 is configured to display the labeled original signal SO2. After the step S33, the analysis method 20 proceeds to the step S34.

In the step S34, the analysis device 14 determines whether a time difference T1 between the timestamp of the hot plugging signal HP1 (corresponding to the first hot plugging signal in FIG. 3) and the timestamp of the hot plugging signal HP2 (corresponding to the second hot plugging signal in FIG. 3) is no less than a predetermined time difference TD1. The hot plugging signal HP1 and the hot plugging signal HP2 are respectively the closest hot plugging signals before and after the original signal SO2; in other words, the hot plugging signal HP1, the original signal SO2 and the hot plugging signal HP2 are generated by the receiver 12 and/or the receiver 13 in sequence.

Specifically, the analysis device 14 is configured to detect the hot plugging status of the display system 10, in which the time difference T1 can be categorized as a short HPD or a long HPD. In some embodiments, when the time difference T1 is less than 2 ms (i.e., the predetermined time difference TD1), it is categorized as a short HPD status; when the time difference T1 is greater than or equal to 2 ms, it is categorized as a long HPD status; however, the present disclosure is not limited thereto. To increase readability, the reference characters T1 and TD1 (and the subsequent T2, TD2, TD3) are used in this disclosure for discussion purposes, and these reference characters are not shown in the drawings.

When the time difference T1 is no less than the predetermined time difference TD1, it means that the receiver 12 and/or the receiver 13 disconnect from the transmitter 11, and the analysis method 20 proceeds to the step S35. When the time difference T1 is less than the predetermined time difference TD1, the analysis method 20 proceeds to the step S37.

In the step S35, the analysis device 14 deletes the result of link training related to the original signal SO2. In some embodiments, the result of link training of the original signal SO2 is stored in a link configuration field, which locates in the DPCD address from 00100h to 001FFh of the DPCD address. In the present embodiment, the analysis device 14 deletes the date in 00100h to 001FFh of the DPCD address. In the step S36, the analysis device 14 determines whether the time difference T1 is greater than or equal to a predetermined time difference TD2. When the time difference T1 is greater than or equal to the predetermined time difference TD2, the analysis device 14 clear the data stored in the storage device 146, wherein the cleared data includes information recorded during the link training, as well as the result of link training. In some embodiments, the predetermined time difference TD2 is approximately 8 s. After the step S36, the analysis method 20 proceeds to the step S38.

In the step S37, the analysis device 14 determines whether a time difference T2 between the timestamp of the hot plugging signal HP1 and the timestamp of an interruption request signal is greater than or equal to a predetermined time difference TD3. When the time difference T2 is greater than or equal to the predetermined time difference TD3, the analysis device 14 labels the original signal SO2 generated within time difference T1 as an abnormal signal, and displays the labeled original signal SO2 by the display device 15. When the time difference T2 is less than the predetermined time difference TD3, the analysis method 20 proceeds to the step S38.

In the step S38, the analysis device 14 is configured to determine whether the result of link training between the transmitter 11 and the receiver 12 and/or the receiver 13 is successful according to the data of the original signal SO2. In some embodiments, the analysis device 14 determines whether the communication stage of the link training is successful according to the data of the original signal SO2. In some embodiments, the link training includes a first and a second communication stage, and the analysis device 14 is able to individually determine whether the first and second communication stage is successful.

Generally, the link training is related to the HDCP specification. In some embodiments, at least one of the transmitter 11, the receiver 12 and the receiver 13 uses the HDCP 2.2 specification. In further embodiments, at least another one of the transmitter 11, the receiver 12 and the receiver 13 uses the HDCP 1.4 specification.

In the step S39, the analysis device 14 receives the EDIDs of the receiver 12 and the receiver 13 and determines whether the transmitter 11 can transmit the EDID prefer timing to the receiver 12 and the receiver 13 according to the EDID and the result of link training, wherein the EDID includes performance parameters of the receiver 12 and the receiver 13, such as the brand, maximum image size, color setting, factory default value, frequency range, model, serial number, etc.

In the step S40, the analysis device 14 obtains an allocate payload of the multiple-stream transfer (MST) of the receiver 12 and/or the receiver 13 according to the topology and the data of the original signal SO2.

In the step S41, the analysis device 14 determines whether the transmitter 11 can transmit the EDID prefer timing to the receiver 12 and the receiver 13 according to the allocate payload of the MST and the EDIDs of the receivers 12, 13. In further embodiments, in the step S41, the analysis device 14 further determines whether the transmitter 11 has transmitted the EDID prefer timing to the receiver 12 and the receiver 13 according to the result of link training.

After performing the analyzing step of the step S28, the analysis method 20 proceeds to the step S29. In the step S29, the analysis device 14 transmits the topology to the display device 15 for displaying on the display device 15. In some embodiments, the analysis device 14 also transmits the analyzing result obtained in the step S28 to the display device 15 for displaying on display device 15.

The sequence of operations shown in FIG. 3 is for illustrative purposes only, and the present disclosure is not limited thereto; any suitable sequences are within the scope of the present disclosure. For example, in other embodiments, steps S32 to S33 may be performed later than the step S41. In further embodiments, multiple steps may be performed simultaneously, e.g., the step S32 and the step S34 may be performed simultaneously. It should be understood that the multiple analysis steps in the step S28 are independent of each other and do not necessarily follow each other in order.

The foregoing outlines features of several embodiments of the present application so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An analysis method, configured to analyze a plurality of original signals on an auxiliary channel of a DisplayPort between a transmitter and at least one receiver, comprising:
   receiving a first original signal of the plurality of original signals;
   dividing the first original signal to obtain a first data of the first original signal and a DisplayPort configuration data (DPCD) address of the first original signal;
   storing the first data according to the DPCD address of the first original signal;
   determining whether the first data is a redundant signal;
   when the first data is not the redundant signal, analyzing the first data, comprising:
   generating a topology of the at least one receiver; and
   displaying the topology.

2. The analysis method of claim 1, further comprising:
   receiving a second original signal of the plurality of original signals;
   dividing the second original signal to obtain a second data of the second original signal and a DPCD address of the second original signal;
   wherein the step of determining whether the first data is the redundant signal comprises:
   comparing the first data with the second data; and
   when the first data and the second data are substantially the same, deleting the stored first data.

3. The analysis method of claim 2, further comprising:
   storing the second data according to the DPCD address of the second original signal,
   wherein the second original signal is received before receiving the first original signal.

4. The analysis method of claim 1, wherein the step of analyzing the first data further comprises:
   comparing a number of defer of the first original signal with a predetermined number; and
   when the number of defer is greater than or equal to the predetermined number, labeling the first original signal, and displaying the labeled first original signal.

5. The analysis method of claim 4, wherein the step of analyzing the first data further comprises:
   determining whether a first time difference between a timestamp of a first hot plugging signal and a timestamp of a second hot plugging signal is greater than or equal to a first predetermined time difference, wherein the first hot plugging signal, the first original signal and the second hot plugging signal are generated by the at least one receiver in sequence;
   when the first time difference is greater than or equal to the first predetermined time difference, deleting a result of a link training of the first original signal;
   determining whether the first time difference is greater than or equal to a second predetermined time difference, wherein when the first time difference is greater than or equal to the second predetermined time difference, deleting the second data; and
   determining whether a third time difference between the timestamp of the first hot plugging signal and a timestamp of an interruption request signal is greater than or equal to a third predetermined time difference, wherein when the third time difference is greater than or equal to the third predetermined time difference, labeling the first original signal as an abnormal signal.

6. The analysis method of claim 1, wherein the step of analyzing the first data further comprises:
   according to the first data, determining whether a result of a link training between the transmitter and the at least one receiver is successful.

7. The analysis method of claim 6, wherein the first data comprises an extended display identification data (EDID) of the at least one receiver, wherein the step of analyzing the first data further comprises:
   determining whether the transmitter is capable of transmitting an EDID prefer timing to the at least one receiver according to the EDID and the result of the link training.

8. The analysis method of claim 7, wherein the step of analyzing the first data further comprises:
   according to the topology and the first data, obtaining an allocate payload of a multiple-stream transfer of the at least one receiver; and
   determining whether the transmitter is capable of transmitting the EDID prefer timing to the at least one receiver according to the allocate payload and the EDID.

9. The analysis method of claim 1, wherein at least one of the transmitter and the at least one receiver has a high-bandwidth digital content protection (HDCP) 2.2 specification.

10. The analysis method of claim 9, wherein at least another one of the transmitter and the at least one receiver has an HDCP 1.4 specification.

11. A non-transient computer-readable medium, configured to store a program code, when the program code, upon execution by a processor, enables the processor to perform the following steps, comprises:
   receiving a first original signal of the plurality of original signals, wherein the plurality of original signals are transmitted via an auxiliary channel of a DisplayPort between a transmitter and at least one receiver;
   dividing the first original signal to obtain a first data of the first original signal and a DPCD address of the first original signal;
   determining whether the first data is a redundant signal;
   when the first data is not the redundant signal, analyzing the first data, comprising:
      generating a topology of the at least one receiver; and
      displaying the topology.

12. The non-transient computer-readable medium of claim 11, wherein the processor further performs the following steps, comprising:
   receiving a second original signal of the plurality of original signals;
   dividing the second original signal to obtain a second data of the second original signal and a DPCD address of the second original signal,
   wherein the step of determining whether the first data is the redundant signal comprising:
      comparing the first data with the second data; and
      when the first data and the second data are substantially the same, deleting the stored first data.

13. The non-transient computer-readable medium of claim 12, wherein the processor further performs the following steps, comprising:
   storing the second data according to the DPCD address of the second original signal,
   wherein the second original signal is received before receiving the first original signal.

14. The non-transient computer-readable medium of claim 11, wherein the step of analyzing the first data further comprises:
   comparing a number of defer of the first original signal with a predetermined number; and
   when the number of defer is greater than or equal to the predetermined number, labeling the first original signal, and displaying the labeled first original signal.

15. The non-transient computer-readable medium of claim 14, wherein the step of analyzing the first data further comprises:
   determining whether a first time difference between a timestamp of a first hot plugging signal and a timestamp of a second hot plugging signal is greater than or equal to a first predetermined time difference, wherein the first hot plugging signal, the first original signal and the second hot plugging signal are generated by the at least one receiver in sequence;
   when the first time difference is greater than or equal to the first predetermined time difference, deleting a result of a link training of the first original signal;
   determining whether the first time difference is greater than or equal to a second predetermined time difference, wherein when the first time difference is greater than or equal to the second predetermined time difference, deleting the second data; and
   determining whether a third time difference between the timestamp of the first hot plugging signal and a timestamp of an interruption request signal is greater than or equal to a third predetermined time difference, wherein when the third time difference is greater than or equal to the third predetermined time difference, labeling the first original signal as an abnormal signal.

16. The non-transient computer-readable medium of claim 11, wherein the step of analyzing the first data further comprises:
    according to the first data, determining whether a result of a link training between the transmitter and the at least one receiver is successful.

17. The non-transient computer-readable medium of claim 16, wherein the first data comprises an EDID of the at least one receiver, wherein the step of analyzing the first data further comprises:
    determining whether the transmitter is capable of transmitting an EDID prefer timing to the at least one receiver according to the EDID and the result of the link training.

18. The non-transient computer-readable medium of claim 11, wherein the step of analyzing the first data further comprises:
    according to the topology and the first data, obtaining an allocate payload of a multiple-stream transfer of the at least one receiver; and
    determining whether the transmitter is capable of transmitting the EDID prefer timing to the at least one receiver according to the allocate payload and the EDID.

19. The non-transient computer-readable medium of claim 11, wherein at least one of the transmitter and the at least one receiver has an HDCP 2.2 specification.

20. The non-transient computer-readable medium of claim 19, wherein at least another one of the transmitter and the at least one receiver has an HDCP 1.4 specification.

* * * * *